United States Patent
Ehinger

(10) Patent No.: US 12,187,463 B2
(45) Date of Patent: Jan. 7, 2025

(54) CONTROL SYSTEM AND CONTROL METHOD FOR CONTROLLING A MOMENTUM WHEEL DEVICE FOR STABILIZING A SPACECRAFT

(71) Applicant: Rockwell Collins Deutschland GmbH, Heidelberg (DE)

(72) Inventor: Markus Ehinger, Weinheim (DE)

(73) Assignee: ROCKWELL COLLINS DEUTSCHLAND GMBH, Heidelberg (DE)

( * ) Notice: Subject to any disclaimer, the term of this patent is extended or adjusted under 35 U.S.C. 154(b) by 82 days.

(21) Appl. No.: 17/264,121

(22) PCT Filed: Jul. 4, 2019

(86) PCT No.: PCT/EP2019/067958
§ 371 (c)(1),
(2) Date: Jan. 28, 2021

(87) PCT Pub. No.: WO2020/025249
PCT Pub. Date: Feb. 6, 2020

(65) Prior Publication Data
US 2021/0171222 A1    Jun. 10, 2021

(30) Foreign Application Priority Data
Jul. 31, 2018   (DE) ......................... 102018118480.8

(51) Int. Cl.
*B64G 1/28* (2006.01)
*B64G 1/24* (2006.01)

(52) U.S. Cl.
CPC ............. *B64G 1/285* (2013.01); *B64G 1/283* (2013.01); *B64G 1/244* (2019.05); *B64G 1/245* (2023.08)

(58) Field of Classification Search
CPC ........ B64G 1/285; B64G 1/283; B64G 1/244; B64G 2001/245; B64G 1/286;
(Continued)

(56) References Cited

U.S. PATENT DOCUMENTS 5,201,833 A * 4/1993 Goodzeit ............... B64G 1/244
701/13
5,723,923 A     3/1998 Clagett
(Continued)

FOREIGN PATENT DOCUMENTS

CN    104155969 A    11/2014
CN    106019944 A    10/2016
(Continued)

OTHER PUBLICATIONS

Biezen, "Physics 11 Rotational Motion (1 of 6) Angular Velocity and Angular acceleration", Mar. 14, 2013, retrieved from YouTube on Nov. 22, 2022, https://www.youtube.com/watch?v=3lp7fyqNlu8 (Year: 2013).*

(Continued)

*Primary Examiner* — Khoi H Tran
*Assistant Examiner* — Tanner L Cullen
(74) *Attorney, Agent, or Firm* — Murphy, Bilak & Homiller, PLLC

(57) ABSTRACT

A control method for controlling a momentum wheel device for stabilizing a spacecraft includes: providing the momentum wheel device as a real momentum wheel device having a momentum wheel driven by a motor; providing a simulated momentum wheel device based on an ideal physical model; concurrent feeding of a torque command to both momentum wheel devices, to change a rotational speed of both momentum wheel devices; controlling the motor to change the rotational speed dependent on the fed torque command; detecting a real rotation angle of the real momentum wheel device; calculating a simulated rotation angle of the simulated momentum wheel device by two-fold integration of the fed torque command; comparing the real rotation angle and the simulated rotation angle and generating an error signal corresponding to a deviation between the real (Continued)

and simulated rotation angles; and controlling the motor due to the error signal to reduce the deviation.

11 Claims, 1 Drawing Sheet

(58) Field of Classification Search
CPC .. B64G 1/281; B64G 1/426; B64G 2001/247; G05B 13/042; G05B 13/041; G05B 13/048; F03G 3/083; B60T 13/06; F16C 2380/28; B60K 6/10
See application file for complete search history.

(56) References Cited

U.S. PATENT DOCUMENTS

| | | | |
|---|---|---|---|
| 5,935,176 A * | 8/1999 | Nielson | B64G 1/38 701/4 |
| 8,282,044 B2 | 10/2012 | Sperandei | |
| 2004/0135034 A1* | 7/2004 | Abel | B64G 1/426 244/165 |
| 2012/0325970 A1* | 12/2012 | Hamilton | H02P 6/06 244/165 |
| 2016/0137318 A1* | 5/2016 | Fitz-Coy | F16F 15/30 244/165 |
| 2016/0355279 A1* | 12/2016 | Lim | B64G 1/242 |
| 2019/0132515 A1* | 5/2019 | Haneda | H04N 23/695 |

FOREIGN PATENT DOCUMENTS

| | | | |
|---|---|---|---|
| DE | 3214378 A1 * | 10/1983 | ............... B64G 1/28 |
| DE | 3921765 A1 | 1/1991 | |
| DK | 3643621 T3 | 9/2022 | |
| FR | 3094479 A1 | 10/2020 | |
| JP | S58183394 A | 10/1983 | |
| JP | H13-78804 | 4/1991 | |
| JP | H04337811 A | 11/1992 | |
| JP | H06131048 A | 5/1994 | |
| JP | H08308286 A | 11/1996 | |
| JP | 2005094964 A | 4/2005 | |
| JP | 2009220768 A | 10/2009 | |
| WO | 2010135421 A2 | 11/2010 | |
| WO | 2012009198 A2 | 1/2012 | |

OTHER PUBLICATIONS

"Running run two DC motors in perfect synchronisation", Picaxe Forum, XP5e5745150, Dec. 6, 2007, pp. 1-11.
Galvan, Eduardo, et al., "ASIC implementation of a digital tachometer with high precision in a wide speed range", IEEE Transactions on Industrial Electronics, IEEE Service Center, vol. 43, No. 6, Dec. 1, 1996, pp. 655-660.
Raschke, Christian, "High Torque for Highly Agile Attitude Control of Optical Remote Sensing Satellites", DLR, Institute of optical sensor systems, Berlin, Techn. Univ., Doctoral Thesis Technical University of Berlin, 2018, 132 pages, 2018.

* cited by examiner

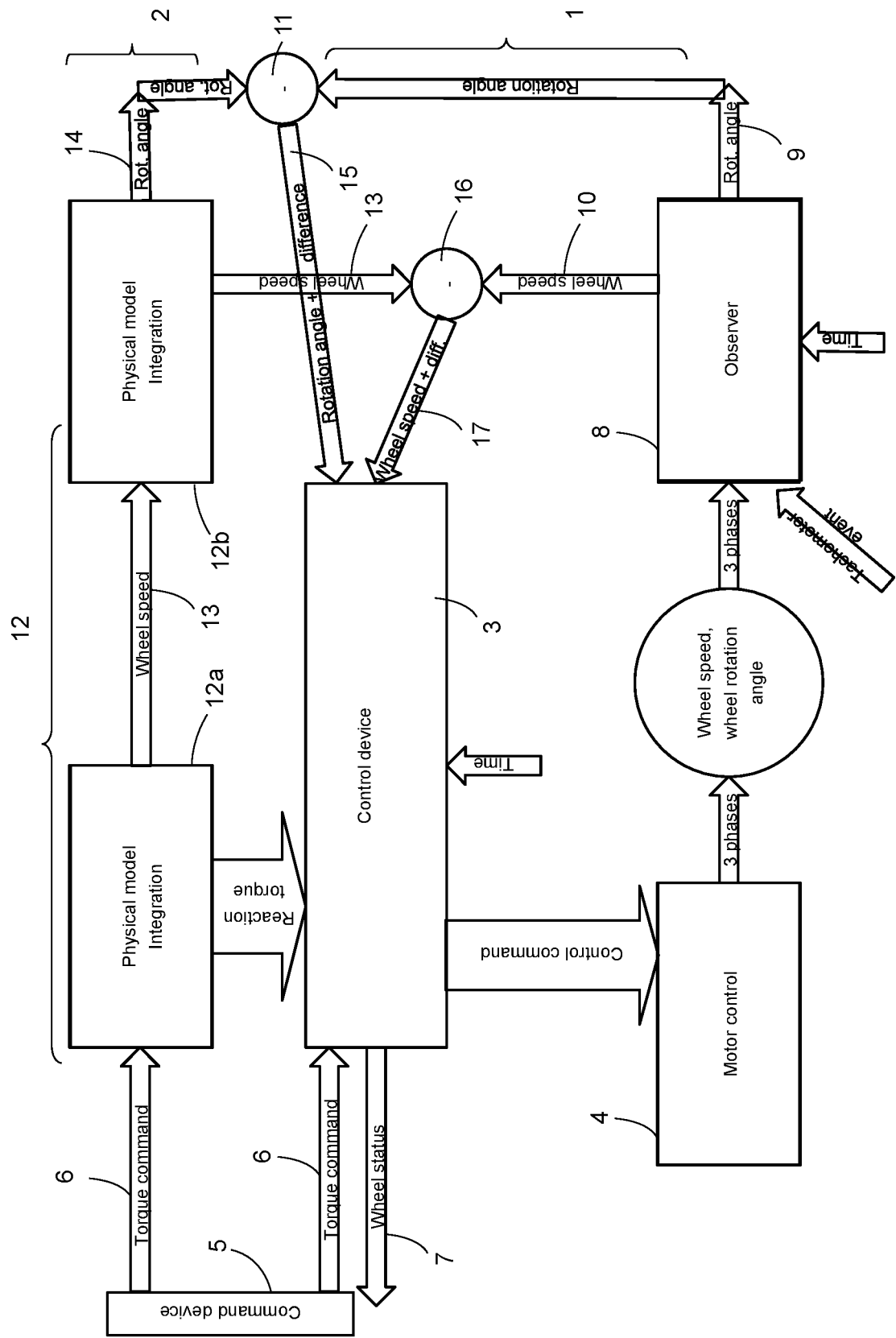

CONTROL SYSTEM AND CONTROL METHOD FOR CONTROLLING A MOMENTUM WHEEL DEVICE FOR STABILIZING A SPACECRAFT

The invention relates to a control system and a control method for a momentum wheel device for stabilizing the position of a spacecraft, in particular, for controlling the position of satellites.

Such momentum wheel devices or flywheels or reaction wheels are known to control the alignment of satellites. The momentum wheel is set rotating by a drive, so that a stabilizing effect can be achieved by the gyroscopic effect. To achieve an efficient gyroscopic effect, it is convenient to position a largest possible part of the mass of the flywheel outwards as much as possible, so that this mass can rotate around the rotation axis of the flywheel (momentum wheel) at a largest possible diameter.

Such a momentum wheel device is known from DE 39 21 765 A1 which, similarly to the wheel of a bicycle, includes an internal stator, an external rotor, and a hub rotatably supporting the rotor on the stator by means of spokes. The hub is rotatably supported on the stator by two rolling bearings which can be designed as fixed or floating bearings.

The rotation movement of the actual momentum wheel (e.g. comprising the rotor, the spokes and the hub) is effected with the aid of a correspondingly controlled drive motor. In the following text, the terms "momentum wheel" and "wheel" and thus also, for example, wheel speed and momentum wheel speed are used synonymously.

Momentum or reaction wheels are usually controlled via torque or speed commands. An internal control loop then tries to implement the command as fast and as accurate as possible. In this process, the aim is a preferably accurate control of the speed.

In this process, the requirements for accuracy can be extremely high. For example, applications are known where the accuracy may not be less than, for example, 0.005 revolutions per minute at 6,000 revolutions per minute. The accuracy is then approx. $10^{-8}$ revolutions per minute.

However, when implementing the control, deviations from the desired rotation behavior of the actual momentum wheel are inevitable due to endless control rates, dead times and delays. These deviations regarding the speed or the rotational position (rotation angle) cause the alignment of a satellite not to change precisely as commanded.

In addition, friction occurs in the real ball bearings of the momentum wheel device due to the rolling movement of the balls, the movement of the bearing cages, the bearing temperature, and the lubrication condition of the bearings. This friction is not chronologically constant, but can change statistically and systematically. The statistical change in the bearing friction, especially in the case of friction peaks, can cause disturbances in the speed control which lead to short-term deviations of the speed. A deviating speed, in turn, directly causes the desired rotational position or the rotation angle of the momentum wheel not to be achieved.

Momentum wheel devices for satellites are known, which include a motor control with a corresponding motor current control which, in turn, is controlled via a speed control for the momentum wheel. Such a speed control can, for example, be controlled via a torque command.

Thus, in the case of such momentum and reaction wheels, a control algorithm is, in addition to the motor current control (motor power stage), provided, which controls the speed. Such controllers are characterized by a good control and stabilization of the speed. However, delays and deviations, which can lead to a deviation of the alignment of a satellite, inevitably occur in the control.

The invention is based on the object to provide a further improved control for a momentum wheel device with which not only the desired speed can be maintained preferably precisely, but with which also misalignments (deviations of the rotation angle) of the momentum wheel can be prevented.

The object is, in accordance with the invention, achieved by a control system having the features of claim 1, as well as by a control method having the features of the independent claim. Advantageous embodiments are stated in the dependent claims.

A control system for a momentum wheel device is provided, where the momentum wheel device is a real momentum wheel device and includes a momentum wheel driven by a motor. Furthermore, a simulated momentum wheel device is provided which simulates the behavior of an ideal momentum wheel based on an ideal physical model. A control device is provided to control the motor of the real momentum wheel device, where a command device is provided to specify a torque command to change the speed of both the real momentum wheel device and of the simulated momentum wheel device. A rotation angle detection device is provided to detect the real rotation angle of the real momentum wheel device. Furthermore, an integration device is provided to calculate a simulated rotation angle of the simulated momentum wheel device due to the specified torque command. Finally, a comparator device is provided to compare the real rotation angle and the simulated rotation angle and generate an error signal corresponding to a deviation between the real rotation angle and the simulated rotation angle, where the error signal can be fed to the control device in order to control the motor due to the error signal to reduce the deviation.

The designation of the various elements as "real" only serves to conceptually separate them from "simulated" components. Thus, the term "real" is not used within the meaning of "actual" or "exact".

Accordingly, two momentum wheel devices are provided in the control system according to the invention, namely the actual real, physically existing momentum wheel device and a (virtual) simulated momentum wheel device. While the real momentum wheel device can be structured in the usual manner and, in particular, includes a motor and a correspondingly supported momentum wheel driven by the motor, the simulated momentum wheel device is solely a physical (calculation) model. This simulated momentum wheel device can, therefore, be understood as a "perfect" momentum wheel which is represented by the mathematical or physical equations of state of the rotational movement without friction. The simulated momentum wheel device is, therefore, based on ideal Newtonian conditions, so that friction losses, measurement errors, measurement delays, etc. are disregarded.

In this process, the following applies:

$$\omega_{t1} = \omega_{t0} + a_{t0} \times \Delta t_1 \quad (1)$$

wherein $\omega$ is the rotational speed (angular speed or speed), $\Delta t$ a time increment, and $\alpha$ the angular acceleration which includes the torque inclusive of the moment of inertia.

The moment of inertia is the J of all rotating components of the wheel (bearing unit+motor rotor+flywheel mass). Internally, different moments of inertia are possible since it is a modular approach that can be adjusted accordingly. For the control to be discussed herein, the torques are always translated by M=a/J. The formulas thereby become independent of the wheel to be used concretely.

With the aid of the integration device, it is possible to integrate this movement equation twice up to the rotation angle φ:

$$\varphi = \varphi_{r0} + \omega_{r0} \times \Delta t_1 + 0.5 \times a_{r0} \times \Delta t_1^2 \quad (2)$$

wherein φ is the rotation angle, ω the rotational speed (angular speed), Δt a time increment, and a the torque inclusive of the moment of inertia.

The calculation for the simulated momentum wheel device can be exactly performed. The underlying software or electronics can, therefore, calculate the desired speed and the rotation angle for any point in time.

The rotation angle corresponds to the rotational position of the actual momentum wheel or of the motor rotor or of the motor shaft in the real momentum wheel device. The motor shaft is firmly connected to the momentum wheel, so that this unit is jointly also referred to as the (real) momentum wheel device.

In the simulated momentum wheel device, the rotation angle as φ according to formula (2) above emerges through two-fold integration of the equation (1).

Due to the two-fold integration, the rotation angle in the simulated momentum wheel device can be determined from the torque (torque command) via the rotational speed or speed. In this process, the integration device performing the integration is part of the simulated momentum wheel device.

It is important that that information is available at a very precise time. In a preferred embodiment, a time precision higher than 1 μs is required and achieved. This is necessary to precisely evaluate angular deviations also in the case of a superimposed speed which can achieve several thousand revolutions per minute.

The two results, namely the detected real rotation angle of the real momentum wheel device and the calculated simulated rotation angle of the simulated momentum wheel device, are merged in the comparator device with a very high chronological precision. In the ideal case, both values are identical, so that a corrective measure is not required. In reality, however, deviations will always occur, which are due to the influencing factors (bearing friction, etc.) already explained above, but also due to measurement errors in the rotation angle detection device.

Therefore, the comparator device can, due to, e.g., only the time-related deviation between the two rotation angles, generate a corresponding error signal which can be fed back to the control device. The control device is then in a position to properly control the motor through a corresponding correction in order to compensate for the deviation between the two (the real and the simulated) rotation angle. In this manner, excellent synchronization between the real momentum wheel device and the ideal simulated momentum wheel device can be achieved, not only with regard to the speed (rotational speed), but also the rotation angle (rotational position).

The command device can be designed to transmit the torque command to the control device for the real momentum wheel, and to the simulated momentum wheel device. Thus, it is to be ensured that both the real momentum wheel device and the simulated momentum wheel device receive the torque command at the same time and can initiate a change of their movement behavior.

A motor control can be provided which can be controlled by the control device and, in turn, serves to operate the motor. In this process, the motor control can, in particular, also include a motor current control.

A rotational speed detection device can be provided to detect the real rotational speed of the real momentum wheel device. The rotational speed detection device and the rotation angle detection device can also be formed by a common measurement device. For example, one or more sensors can be provided on the motor or on the real momentum wheel which detect when the motor rotor, the motor shaft or the momentum wheel have reached a certain position. Thus, the rotation angle position in that moment can be determined on one hand. On the other hand, the rotational speed can be derived therefrom, taking time into account.

An observer combining the rotation angle detection device and the rotational speed detection device can be provided to determine the real rotational speed and/or the real rotation angle of the real momentum wheel device, where the observer is designed to perform an error correction of the rotational speed and/or of the rotation angle of the real momentum wheel device. The observer thus estimates the actual position or the actual speed of the momentum wheel based on the measured speed or the measured rotation angle, taking into account additional information.

The observer is therefore in a position to achieve an improved measurement quality beyond the simple rotational speed or rotation angle detection by reprocessing the measured values by filters or correction algorithms. In this process, for example, measurement delays can be compensated for (offset) due to the sensors used so that the determined measured values reproduce the actual state, i.e. the actual real rotational speed or the actual real rotation angle, as precisely as possible. The observer can also estimate further physical properties such as bearing friction and temperature and provide them for better pre-control.

It has been explained above that the integration device is designed to perform two-fold integration of the equation of state of the rotational movement. In addition, the integration device can also be designed to calculate a simulated speed or rotational speed of the simulated momentum wheel device by simple integration of the given torque command, where a rotational speed comparator device can be provided to compare the real rotational speed and the simulated rotational speed and generate a rotational speed deviation signal corresponding to a deviation between the real rotational speed and the simulated rotational speed.

This simply means that the (interim) result of the integration device following the first integration, namely the simulated speed or rotational speed thereby determined, is already used to provide information, for example, for the control device. The information about the simulated rotational speed or the comparison between the simulated rotational speed and the real rotational speed and the rotational speed deviation signal resulting therefrom can also be used to improve the control.

Finally, a control method for controlling a momentum wheel device for stabilizing a spacecraft is provided, comprising the steps of:
  providing the momentum wheel device as the real momentum wheel device comprising a momentum wheel driven by a motor;
  providing a simulated momentum wheel device based on an ideal physical model;
  concurrent feeding of a torque command to the real momentum wheel device and to the simulated momentum wheel device to change their particular rotational speed;
  controlling the motor to change the rotational speed dependent on the fed torque command;

detecting a real rotation angle of the real momentum wheel device;

calculating a simulated rotation angle of the simulated momentum wheel device by two-fold integration of the fed torque command;

comparing the real rotation angle and the simulated rotation angle and generating an error signal corresponding to a deviation between the real rotation angle and the simulated rotation angle; and controlling the motor due to the error signal to reduce the deviation.

As explained above, the (real) momentum or reaction wheel is, in accordance with the invention, controlled via a torque command. At the same time, the torque command also controls the simulation of a perfect momentum wheel and the controller (the control device) of the real momentum wheel. The control of the real momentum wheel is not only adjusted to maintaining the speed, but also to the parallel running of the wheel rotation angles, i.e. to a preferably small difference between the rotation angles of the real momentum wheel and of the perfect simulated momentum wheel.

The control error is determined by the difference of the rotation angles between the simulated perfect wheel and the movement of the real wheel estimated by an observer. A deviation of the speed between the simulated wheel and the real wheel is admitted to minimize the difference in the wheel rotation angle between the simulated wheel and the observed real wheel. Thus, the topmost control object is to harmonize the wheel rotation angles of both wheels.

Due to limits for the speed deviation and the wheel angle deviation, the maximum alignment deviation on a satellite level can be described and calculated in advance. The control accuracy of a momentum or reaction wheel is described by a maximum deviation of the angle between the simulated perfect wheel and the observed real wheel.

These and additional advantages and features are explained in more detail in the following text, based on an example with the aid of the accompanying FIGURE. The only FIGURE shows, in a schematic form, the structure of a control system for a momentum wheel device for stabilizing a spacecraft.

The control system essentially consists of a real momentum wheel device 1 and a simulated momentum wheel device 2. The real momentum wheel device 1 is that momentum wheel device which is to be controlled by the control system within the actual meaning and which is used for the stabilization or alignment of the satellite. In principle, it is structured in a known manner and includes an actual momentum or reaction wheel not shown in the FIGURE, which is set in rotational motion by a motor which is also not illustrated. Due to the rotation of the momentum wheel and the gyroscopic effect arising in this process, the desired stabilizing effect is achieved. A similar flywheel device with regard to the mechanical structure of the real momentum wheel device 1 is known from DE 39 21 765 A1.

The real momentum wheel device 1 includes a control device 3 to control an actual motor control 4 which, in turn, includes the power electronics or current controller for the motor, etc.

The control device 3 can be elaborately designed and take appropriate control measures in a known manner such as accelerating or decelerating the momentum wheel, as well as corresponding start and stop functions. In addition, it is possible to store information (e.g. tables) in the control device 3 at which conditions (rotational speed, temperature, etc.) which bearing conditions (e.g. bearing friction) exist on the momentum wheel. If, for example, the satellite moves in a very cold area (shadow), the momentum wheel bearings will be cooled, whereby the bearing friction can increase. To compensate for this effect, the control device 3 can take corresponding control measures.

A command device 5 which, for example, can be part of the actual satellite control, is upstream of the control device 3. In this case, for example, a desired movement or alignment of the satellite is preset, which leads to a corresponding commanding of the momentum wheel device 1. Correspondingly, the command device 5 gives a torque command 6 to the control device 3. In this process, the torque is the physical basic command of the speed and underlies the change in the rotational speed of the momentum wheel.

The control device 3 can supply appropriate status information 7 to the superordinate satellite control from which, for example, information about the wheel status, the wheel speed or the wheel angle is obtained.

The motor controlled by the motor control 4 effects the rotational movement of the real momentum wheel. The rotational movement can be measured in a suitable manner. For example, it is known to provide Hall sensors (e.g. three Hall sensors) on the motor rotor in order to lock the rotational position of the rotating wheel.

Taking time into account, also the wheel rotational speed can be directly derived from the rotational position (the wheel rotation angle). For this purpose, an observer 8 is provided, which includes a rotation angle detection device and a speed or rotational speed detection device. In addition, the observer 8 can also provide further correction or estimation methods to detect the actual position of the wheel (the wheel rotation angle) or the wheel speed as precisely as possible. Due to the high rotational speed of the momentum wheel (e.g. 6000 revolutions per minute) on one hand and the extremely high requirements for the measurement accuracy on the other hand (e.g. an accuracy of 0.005 revolutions per minute is to be achieved for this high rotational speed of, e.g., 6000 min$^{-1}$), the results of the observer 8 is usually never exact information, but best possible estimations at all times.

As a result of the observer 8, the real rotation angle 9 on one hand and the real rotational speed 10 (wheel speed) on the other hand is output.

The real rotation angle is delivered to a comparator device 11 to be explained later.

Parallel to the real momentum wheel device 1 thus described, the simulated momentum wheel device 2 is provided.

It is solely based on an ideal physical model 12, namely the equation of state for a rotational movement which, for example, can have the following form:

$$\varphi = \varphi_{t0} + \omega_{t0} \times \Delta t_1 + 0.5 \times a_{t0} \times \Delta t_1^2 \qquad (2)$$

wherein $\varphi$ is the rotation angle, $\omega$ the rotational speed (angular speed), $\Delta t$ a time increment, and a the torque inclusive of the moment of inertia.

Thus, the simulated momentum wheel device 2 is solely realized with software, without requiring "real-world" mechanical momentum wheel components. The same torque command 6 from the command device 5, which is also fed to the control device 3, serves as an input variable for the physical model. The torque command 6 must naturally be fed to the real momentum wheel device 1 and to the simulated momentum wheel device 2 at the same time. In the physical model 12, a first integration 12a occurs initially, so that, as a result, a simulated speed or rotational speed 13 is obtained.

The simulated rotational speed 13 is subjected to a second integration 12b, whereby a simulated rotation angle 14 is obtained. This simulated rotation angle 14 is an ideal value due to the ideal physical model. Thus, it is a target value at the same time which is to be achieved by the real momentum wheel device 1.

For this purpose, the simulated rotation angle 14 is also fed to the comparator device 11, where a comparison between the simulated rotation angle 14 and the real rotation angle 9 is made. The difference identified in this process is fed back to the control device 3 as an error signal 15. The control device 3 is then, in turn, in a position to control the motor control 4 and thus the real momentum wheel in order to change the rotational speed of the real momentum wheel and reduce the error between the simulated rotation angle 14 and the real rotation angle 9.

The simulated rotational speed 13 can, together with the real rotational speed 10, be fed to a rotational speed comparator device 16. The rotational speed comparator device 16 determines a deviation between the values and can, accordingly, supply a rotational speed deviation signal 17 to the control device 3. This signal can be further processed as information by the control device 3. However, for the actual momentum wheel control it is subordinate since it is solely performed due to the determined rotation angles 9, 14 or their deviations from one another.

The invention claimed is:

1. A control system for a momentum wheel device that is a real momentum wheel device having a rotational speed range and including a momentum wheel driven by a motor, the control system comprising:
a simulated momentum wheel device configured to simulate a behavior of an ideal momentum wheel for up to 6000 revolutions per minute, based on an ideal physical model;
a control device configured to control the motor of the real momentum wheel device to drive the real momentum wheel to up to 6000 revolutions per minute;
a command device configured to specify a torque command to change a speed of both the real momentum wheel device and of the simulated momentum wheel device;
a rotation angle detection device configured to continuously detect a real rotation angle of the real momentum wheel device;
an integration device configured to continuously calculate a simulated rotation angle of the simulated momentum wheel device due to the given torque command and with a time precision that is higher than 1 μs;
a comparator device configured to compare the real rotation angle and the simulated rotation angle, and to generate an error signal corresponding to a deviation between the real rotation angle and the simulated rotation angle, wherein the error signal can be fed to the control device to control the motor due to the error signal in order to reduce the deviation.

2. The control system of claim 1, wherein the command device is configured to transmit the torque command to the control device for the real momentum wheel device and to the simulated momentum wheel device.

3. The control system of claim 1, wherein the simulation of the behavior of the ideal momentum wheel is conducted based on the ideal physical model, without accounting for friction.

4. The control system of claim 1, wherein the ideal physical model corresponds to an equation of state of a rotational movement.

5. The control system of claim 4, wherein the equation of state has the following form:

$$\varphi = \varphi t0 + \omega t0 \times \Delta t1 + 0.5 \times \alpha t o \times \Delta t1^2$$

wherein $\varphi$ is the rotation angle, $\omega$ is the rotational or angular speed, $\Delta t$ is a time increment, and a is the torque inclusive of the moment of inertia.

6. The control system of claim 1, wherein the integration device is configured to calculate the simulated rotation angle by two-fold integration of the torque command.

7. The control system of claim 1, wherein a motor control is provided which can be controlled by the control device and, in turn, serves to operate the motor.

8. The control system of claim 1, further comprising a rotational speed detection device configured to detect the real rotational speed of the real momentum wheel device.

9. The control system of claim 8, wherein:
an observer combining the rotation angle detection device and the rotational speed detection device is configured to determine the real rotational speed and/or the real rotation angle of the real momentum wheel device, and
the observer is further configured to perform an error correction of the rotational speed and/or of the rotation angle of the real momentum wheel device.

10. The control system of claim 1, wherein the integration device is configured to calculate a simulated rotational speed of the simulated momentum wheel device by simple integration of the given torque command, the control system further comprising:
a rotational speed comparator device configured to compare the real rotational speed and the simulated rotational speed, and to generate a rotational speed deviation signal corresponding to a deviation between the real rotational speed and the simulated rotational speed.

11. A control method for controlling a momentum wheel device for stabilizing a spacecraft, the method comprising:
providing the momentum wheel device as a real momentum wheel device having a rotational speed range and comprising a momentum wheel driven by a motor;
providing a simulated momentum wheel device configured to simulate a behavior of an ideal momentum wheel for up to 6000 revolutions per minute, based on an ideal physical model;
concurrent feeding of a torque command to the real momentum wheel device and to the simulated momentum wheel device to change a rotational speed of both the real momentum wheel device and the simulated momentum wheel device;
controlling the motor to change the rotational speed dependent on the fed torque command and to drive the real momentum wheel to up to 6000 revolutions per minute;
continuously detecting a real rotation angle of the real momentum wheel device;
continuously calculating a simulated rotation angle of the simulated momentum wheel device by two-fold integration of the fed torque command and with a time precision that is higher than 1 μs;
comparing the real rotation angle and the simulated rotation angle and generating an error signal corresponding to a deviation between the real rotation angle and the simulated rotation angle; and
controlling the motor due to the error signal to reduce the deviation.

\* \* \* \* \*